United States Patent
Pinault et al.

[11] Patent Number: 5,812,553
[45] Date of Patent: Sep. 22, 1998

[54] MULTI-PATH BUS DIGITAL PROCESSOR

[75] Inventors: Michael Pinault, Hudson, N.H.; Malcom Strandberg, Cambridge, Mass.

[73] Assignee: Davox Corporation, Westford, Mass.

[21] Appl. No.: 683,164

[22] Filed: Jul. 18, 1996

Related U.S. Application Data

[63] Continuation of Ser. No. 252,336, Jun. 1, 1994, abandoned.

[51] Int. Cl.[6] .................................................. H04J 3/02
[52] U.S. Cl. .......................... 370/419; 370/463; 379/284; 379/93.05
[58] Field of Search .................................... 370/351, 362, 370/364, 419, 431, 442, 445, 522, 463; 395/281, 309, 821, 822; 379/399, 402, 93.05, 284; 375/222, 220

[56] References Cited

U.S. PATENT DOCUMENTS

| | | | |
|---|---|---|---|
| 4,640,992 | 2/1987 | Rose | 370/428 |
| 4,718,057 | 1/1988 | Venkitakrishnan et al. | 370/229 |
| 4,975,904 | 12/1990 | Mann et al. | 370/389 |
| 5,046,072 | 9/1991 | Shimizu et al. | 370/463 |
| 5,299,198 | 3/1994 | Kay et al. | 370/347 |
| 5,341,368 | 8/1994 | Henning et al. | 370/351 |
| 5,604,740 | 2/1997 | Pinault et al. | 370/463 |

*Primary Examiner*—Douglas W. Olms
*Assistant Examiner*—Seema S. Rao
*Attorney, Agent, or Firm*—Daniel J. Bourque, Esq; Kevin J. Carroll, Esq

[57] ABSTRACT

A multi-path digital signal processor for use in a telephony system provides a first data path for interfacing to a local area network, a second data path for interfacing to a Versa-bus Modular Eurocard (VME) bus, and at least one third data path for interfacing to at least one pulse code modulation digital signal path. The Digital Signal Processor may transmit and receive data by any or all of these means to allow efficient data transfer and processing by the Digital Signal Processor in a telephony system.

21 Claims, 2 Drawing Sheets

MULTI-PATH BUS DIGITAL PROCESSOR

This application is a continuation of application Ser. No. 08/252,336, filed Jun. 1, 1994 now abandoned.

FIELD OF THE INVENTION

This invention relates to a digital signal processor system, and more particularly, to a digital signal processing system which provides three separate paths for sending and receiving data both inside and outside the processing system.

RELATED APPLICATION

This application is related to co-pending U.S. patent application Ser. No. 08/252,121, now abandoned, assigned to the assignee of the present invention and fully incorporated herein by reference.

BACKGROUND OF THE INVENTION

Many businesses and customer service organizations utilize telephony distribution systems to route and process incoming and outgoing calls. Such telephony systems often include digital communication servers, which may include digital signal processing systems. Such systems use digital signal processing for analyzing telephonic signals such as busy tones, voice, answer machines and various tones generated by telephone equipment. Also, digital signal processing can be used to generate signals such as digital voice, or tones for dialing telephones, connect calls to and from trunk lines, and interface with a host computer or database, to illustrate a few examples.

Digital signal processors (DSP's) must process massive amounts of data in real time. Therefore, the DSP must be well integrated within a processing system and have very fast data paths to move data to and from of the DSP. A standard way of sending signals to be processed to the DSP is through pulse code modulation (PCM). PCM is a digitized signal which represents the analog signal to be analyzed. It can often be multiplexed with other signals in a method known as time division multiplex (TDM) whereby several PCM signals are multiplexed together to use one data path. TDM allows a single DSP to handle multiple digital signals to be processed, thereby making efficient use of system resources.

The DSP must be able to input and output digital signals, however, it also is a powerful computer in its own right and must be able to transfer program data from other systems to itself, and output data to other systems. This is often done over a bus such as a Versa-bus Modular Eurocard (VME). This is a standardized backplane bus which allows data to be transferred within a digital communication server system. Examples of data to be transferred will be executable code for the DSP to execute, or digital voice files for the DSP to synthesize and send out as PCM signal.

Still another way to send data to and from a DSP is through the use of a local area network. This can be in the form of ethernet or token ring. Local area networks are often used for sending commands and programs to individual systems, as well as doing diagnostics and analyzing data dumps.

So to be properly integrated within a system, a DSP must be able to accept many different types of data, such as digital signal, serial data, program data, and commands. Also, the DSP must be able to communicate with many other subsystems within the digital communication server, some of which may not share the same communication paths with the DSP.

Even though a DSP may be able to handle several digital channel signals at once, the needs of a system will often require more than one DSP to be present to handle the signal processing load. Each separate DSP must be able to communicate with all other subsystems within the digital communication server, to work properly. However, as system requirements change or grow, the number of DSPs required may also change. Therefore, a system where modular DSPs may be easily added or removed as needed can provide a much more versatile system.

DSPs have been integrated into telephony systems using at most only two communication paths. DSPs have typically used a PCM path to send and receive digitized signals and a backplane bus for everything else. If the telephony systems did include some form of local area network, the local area network was interfaced to another part of the system, with data then shuttled to the DSP on the VME bus. This required other parts of the system to provide processing assistance to the DSP and prohibited easy expansion or resizing of the number of DSPs in the system. Also, having few data paths prevented the DSP from having backup communication paths should one particular path not be available. This may occur in an overloaded system, or one with a partial system failure. This may also occur if a particular model of DSP is installed in a system that provided different communication paths than the standard VME and PCM paths.

Accordingly, what is needed is a DSP that can communicate on three separate paths to other parts of the system, thereby allowing for efficient data transfer within and without the system, and allow for easy modular expansion of the system for adding or removing DSP units as necessary to meet system requirements.

SUMMARY OF THE INVENTION

In accordance with the present invention a digital signal processor which includes three separate communication paths for providing digital signal processing within a digital communication server or telephony system is provided. The DSP card includes a local area network controller which allows it to communicate over ethernet or another local area network system, a VME bus controller which allows it to communicate over a standard VME backplane bus and at least one PCM communication path, which allows the processor to communicate over one of many possible PCM communication paths to send and receive digitized signals to other parts of the digital communication server system. All of these paths are available for communication, sometimes simultaneously, depending upon the type of data being transferred, and availability of paths. The DSP is completely self-contained, so adding new DSPs to the system is very simple.

In a typical arrangement, the digital signal processor will receive system commands and executable code via the local area network, and may also send program dumps and diagnostic data out over the same path. The VME bus can be used to perform direct memory accesses (DMA) to and from subsystems including storage systems and other data processing systems within the digital communication server system. Finally, synchronous data such as digitized speech or telephone signals can be sent or received by one of the PCM paths. The various paths can be used for other data transfer depending upon availability of other paths within the system. For example, should a DSP be installed in a telephony system that does not support a local area network connection to each DSP, then the local area network will not be used by the DSP in that system.

Since the DSP is completely self-contained with all the circuitry necessary to communicate by the separate paths, modular growth of a system is possible by adding extra DSP boards as necessary to perform the digital signal processing required by the system.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
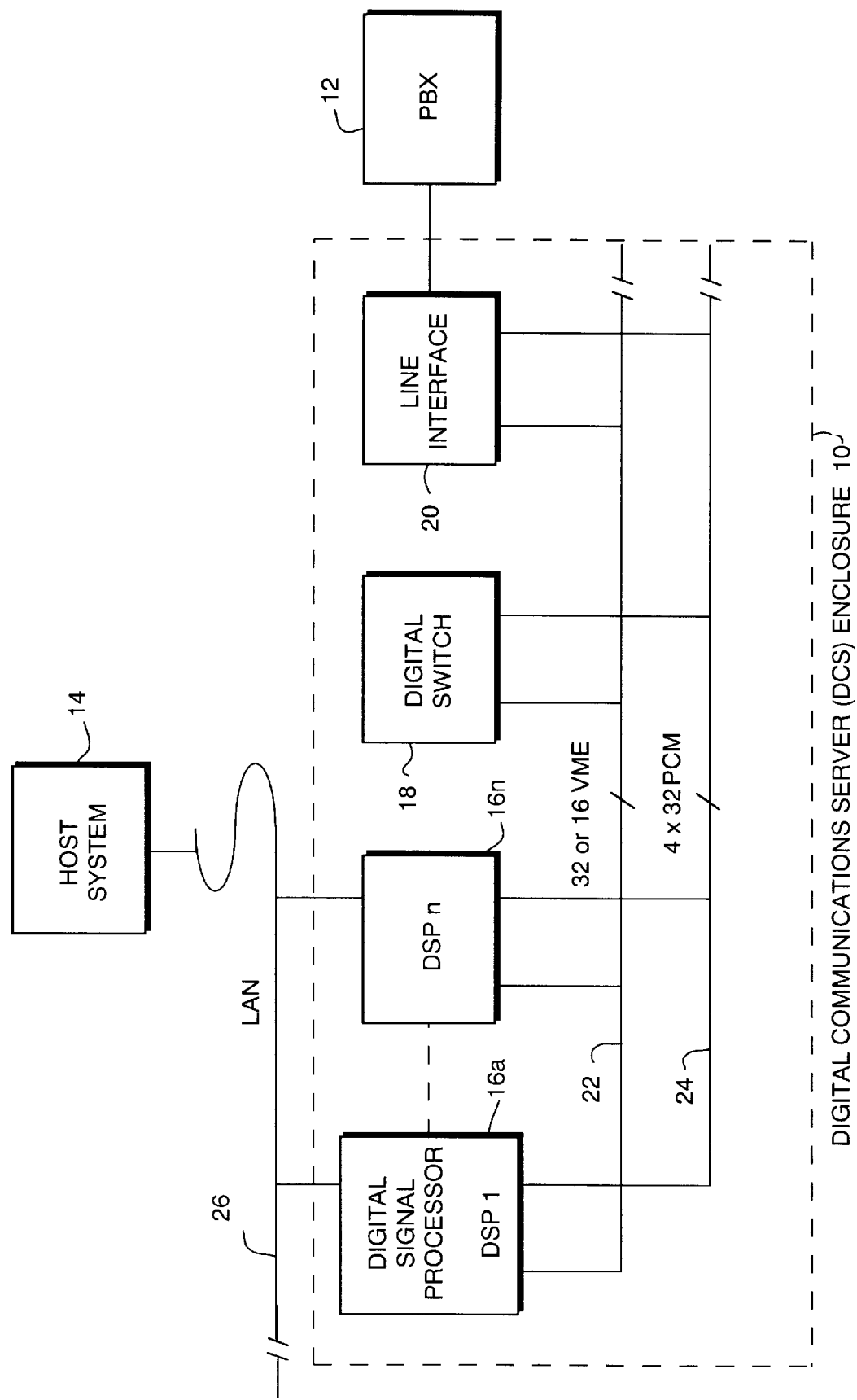
FIG. 1 is a diagrammatical representation of a digital communication server which contains DSPs which are connected to a local area network, a VME backplane bus, and multiple PCM signal paths according to the present invention.

A telephony system including a digital communication server 10, FIG. 1, which contains digital signal processors with multiple data paths may be provided for example, as the Davox Unison™ System manufactured by Davox Corporation, Westford, Mass. and described in greater detail in U.S. patent application. Ser. No. 08/252,121, abandoned incorporated herein by reference. The digital communication server (DCS) 10 interfaces with other systems including, for example, a private branch exchange 12 for connecting to trunk lines to send and receive telephone calls. The digital communication server 10 may also interface to a host system 14, which controls the DCS and provides software and management of the system.

In the preferred embodiment, host system 14 is a Sun Microsystem's brand "SPARC" computer. Inside DCS enclosure 10 there are many digital signal processors 16a–16n along with digital switch 18 and line interface 20. A standard Versa-bus Modular Eurocard (VME) communication bus 22 connects all the systems and sub-systems within the DCS. In the preferred embodiment, the bus is a 16 bit VME standard backplane bus. A 32 bit VME bus may also be provided. The VME backplane bus provides a standard communication path for DSC 10 and may also interface to storage devices such as tape drives, floppy disks, or hard disk drives (not shown) and provide direct memory access to various other system resources.

PCM data path 24 is also available for transmitting digitized telephony or voice signals within the system. In the preferred embodiment, the PCM data path comprises four separate thirty-two path connections which provide individual data paths for differential driven signals to the system elements that require it. For example, a telephone call will come in through private branch exchange 12 and by sent into line interface 20 which will connect to one of the PCM data paths on the PCM multi-path bus 24. Digital switch 18 will then route the signal to another possible path on the PCM multi-path bus to be sent on to a specific digital signal processor 16a. Digital signal processor (DSP) 16a will then process the telephony signals and perform any other system requirements as needed with the signal. Each DSP may receive one signal from each of the four separate groups of thirty-two paths at one time. So each DSP can receive four signals simultaneously on each of the four separate thirty-two path connections. Digital switch 18 is responsible for routing the signals to appropriate paths to allow each DSP card (16a–16n) to receive the signals that it is responsible for processing. In the preferred embodiment, the digital signal may be encoded by Linear Predictive Coding.

Host system 14 can communicate to each DSP card over a local area network 26. This local area network may comprise twisted pair ethernet, thin wire ethernet, token ring, or token bus ethernet.

Figure 2:
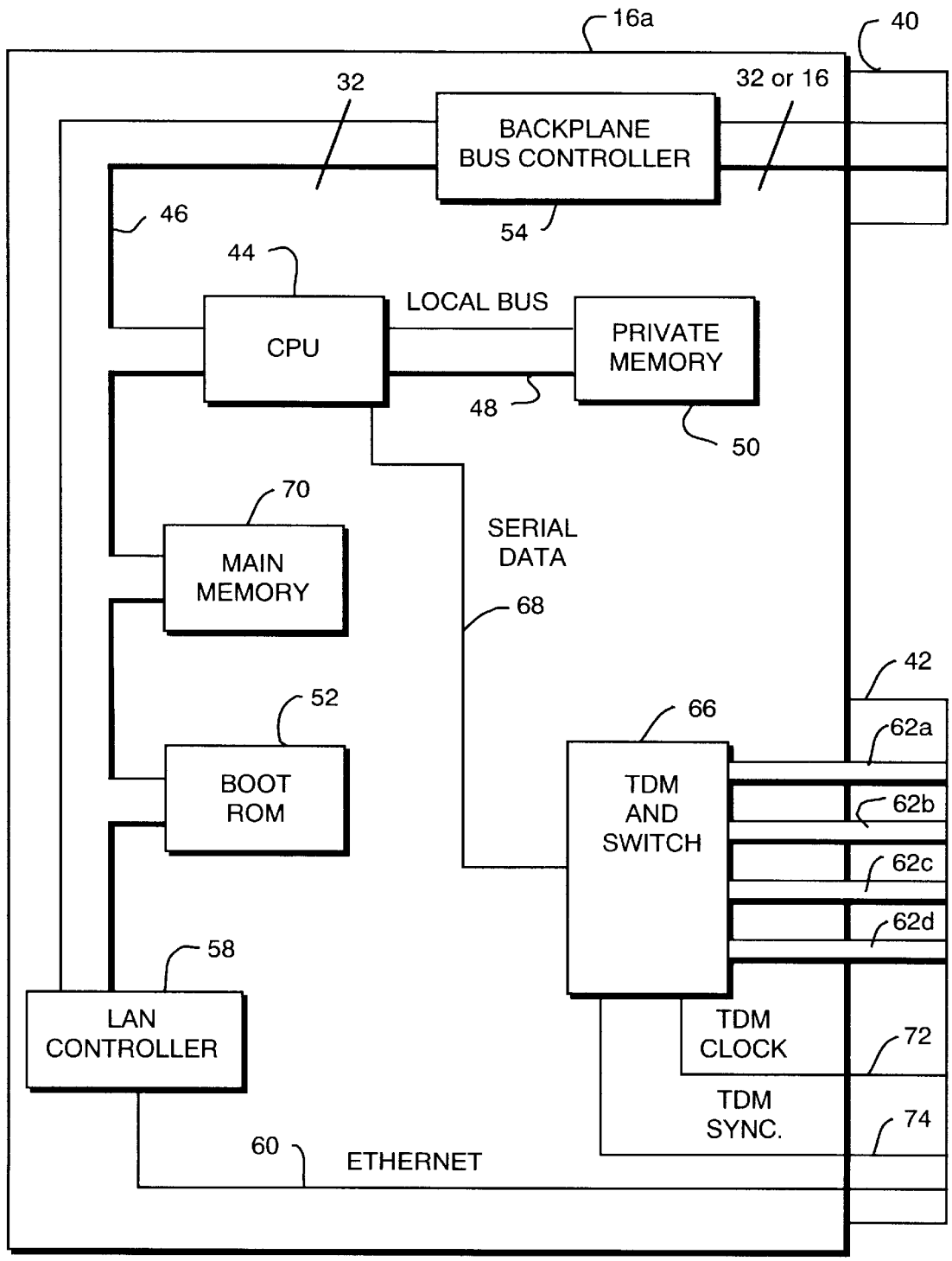
FIG. 2 is a diagrammatical representation of a Digital Signal Processor showing the major components that allow the DSP to communicate by means of the separate data paths in accordance with the present invention.

Turning now to FIG. 2 an individual digital signal processing printed circuit board is presented. DSP card 16a has edge connector 40 for VME bus and connector 42 for the PCM multi-paths. Internally on the DSP card is a CPU 44. CPU 44 provides control for the DSP card and also performs the digital signal processing. CPU 44 is connected to main bus 46 which is a thirty-two bit internal bus for communication on the DSP card. Local bus 48 is also provided which connects CPU 44 to random access memory 50. Local bus 48 provides fast access to RAM 50 allowing CPU 44 to avoid the slower main bus 46 for memory access. Main bus 46 connects to boot ROM 52 which provides start up software for CPU 44 when the system is activated. Also connected to main bus 46 is local area network controller 58. Local area network controller 58 provides packeting and collision detection, as well as address management for the DSP. Local area network signals go out over line 60 through connector 42 to a companion paddle card as described in co-pending application, Ser. No. 08/252,335, pending incorporated herein by reference. The companion paddle card may provide some extra circuitry for controlling the local area network, which then connects by a standard ethernet connector onto ethernet 26, FIG. 1. Alternatively, local area network controller 58 may provide token ring management for connecting the system to a token ring.

Main bus 46 also connects to a VME controller 54. VME controller 54 connects to VME path 56 which leaves DSP card 16a through connector 40. This connects to VME 22, FIG. 1 bus on the digital communication system server backplane. VME controller 54 provides for complete bus management as well as converting 16-bit VME bus to 32-bit main bus 46 protocol.

PCM multi-paths 62a–62d attach to the DSP card 16a through connector 42. Each path, for example path 62a, may comprise thirty-two individual differentially driven lines. Path 62a enters switch 64a, which allows the selection of one line from the thirty-two lines available. CPU 44 selects which line it will send and receive pulse code modulated signals over. The single chosen path proceeds to time division multiplexer 66, which allows the four input and output paths to be multiplexed to one data path 68 to the CPU 44. CPU 44 is capable of analyzing or synthesizing four multiplexed signals at one time. In the preferred embodiment, the differential driven PCM paths transmit and receive data at speeds up to 64 kilobits per second.

In the preferred embodiment DSP card 16a will use various paths to send and receive various types of data. The local area network which connects to a host system will be used to receive commands from the host system, executable code to be executed by the DSP's CPU, and may also send out program dumps to be analyzed by the host system as well as interactive diagnostics.

The VME bus will be used to perform direct memory accesses to other parts of the system, such as loading data into local memory from a storage device located elsewhere in the digital communication server. Also, control signals such as data line selection for PCM and processing instructions may be sent and received over the VME bus. PCM multi-paths are mostly used for synchronous data such as digitized speech and telephony information, which is usually in the form of pulse code modulated digital signals.

For example, turning back to FIG. 1, if DSP 16$n$ card is to play a digitized message over a phone line connected to the system, the commands to transmit the digital voice will be received over local area network line 26 from host system 14. The digitized voice file will be received over VME bus 22 which will allow the digitized voice file to be loaded into RAM on DSP 16$n$. DSP 16$n$ will then synthesize the digital voice to be sent out over a selected line in PCM multi-path 24, which is connected through digital switch 18 to telephone line interface system 20 which connects it to the trunk line out to private branch exchange 12. This allows DSP 16$n$ to play the voice message out over the telephone line to the listener at the other end.

Although each path lends itself to sending and receiving certain types of data and signals, different paths may be used to transfer data. For example, in a system that does not have a local area network, the commands and executable code can be sent to a DSP over the VME bus. As another example, pulse code modulated digital signals may also be sent over the VME bus in the form of converting the signal serial data into sixteen-bit data to be received in parallel over the VME bus and then analyzed by the DSP.

Modifications and substitutions by one of ordinary skill in the art are considered to be within the scope of the present invention which is not to be limited except by the claims which follow.

What is claimed is:

1. A digital communications server for use in a telephony system, said digital communications server comprising:
   at least one multi-path digital signal processor including:
      a central processing unit;
      means, responsive to said central processing unit, for directly interfacing to a local area network and for controlling an interface to said local area network;
      means, responsive to said central processing unit, for interfacing to a standard computer backplane bus;
      means, responsive to said central processing unit, for interfacing to at least one pulse code modulation signal path;
   a line interface, coupled to said standard computer backplane bus and to said at least one pulse code modulation signal path, for interfacing with a private branch exchange and for receiving at least one signal from said private branch exchange; and
   a digital switch, coupled to said standard computer backplane bus and to said at least one pulse code modulation signal path, for routing said at least one signal to said at least one multi-path digital signal processor.

2. The digital communications server of claim 1, further including a plurality of said at least one multi-path digital signal processors.

3. The digital communications server of claim 2, wherein said means for interfacing to a standard computer backplane bus includes a means for transferring data to other digital signal processors.

4. The digital communications server of claim 1, wherein said means for interfacing to a local area network includes a means for receiving commands from said local area network.

5. The digital communications server of claim 1, wherein said means for interfacing to a local area network includes means for receiving executable code for execution by said at least one multi-path digital signal processor.

6. The digital communications server of claim 1, wherein said means for interfacing to a local area network is operative to send program dumps out over said local area network to be analyzed by said telephony system.

7. The digital communications server of claim 1, wherein said means for interfacing to a local area network is operative to perform diagnostics over said means for interfacing to a local area network, with said telephony system.

8. The digital communications server of claim 1, wherein said means for interfacing to a standard computer backplane bus includes a means for performing direct memory access transfers from said telephony system.

9. The digital communications server of claim 1, wherein said means for interfacing to at least one pulse code modulation signal path includes means for sending and receiving synchronous data for processing by said digital signal processor.

10. The digital communications server of claim 9, wherein said synchronous data is Linear Predictive Coded speech.

11. The digital communications server of claim 1, wherein said means for interfacing to at least one pulse code modulation signal path includes means for sending and receiving time division multiplexed data.

12. The digital communications server of claim 1, wherein said means for interfacing to at least one pulse code modulation signal path includes means for sending and receiving digitized speech.

13. The digital communications server of claim 1, wherein said means for interfacing to at least one pulse code modulation signal path includes means for sending and receiving telephony signals.

14. The digital communications server of claim 1, wherein said at least one pulse code modulated signal path is differentially driven.

15. The digital communications server of claim 1, wherein said local area network includes an ethernet, and wherein said means for interfacing to said local area network includes a thin wire ethernet connector.

16. The digital communications server of claim 1, wherein said local area network includes a token ring.

17. The digital communications server of claim 1 wherein said means for interfacing to a standard computer backplane bus includes a Versa-bus Modular Eurocard (VME) bus connector.

18. The digital communications server of claim 1 wherein said means for interfacing to said at least one pulse code modulation signal path includes a 4 by 32 multiplexed data path.

19. The digital communications server of claim 1 wherein said means for interfacing to said at least one pulse code modulation signal path includes a 4 by 16 multiplexed data path.

20. A digital communications server for use in a telephony system, said digital communications server comprising:
   a backplane bus;
   at least one pulse code modulation signal path;
   a plurality of multi-path digital signal processors, each of said plurality of multi-path digital signal processors including:
      a local area network data path interface, for interfacing with a local area network;
      a standard computer backplane bus interface, for interfacing with said standard computer backplane bus; and
      a pulse code modulation signal path interface, for interfacing with said at least one pulse code modulation signal path;

a line interface, coupled to said standard computer backplane bus and to said at least one pulse code modulation signal path, for interfacing with a private branch exchange and for receiving at least one signal from said private branch exchange; and a digital switch, coupled to said standard computer backplane bus and to said at least one pulse code modulation signal path, for routing said at least one signal to one of said plurality of multi-path digital signal processors over said at least one pulse code modulation signal path.

21. A digital communications server for use in a telephony system, said digital communications server comprising:

a backplane bus;

a plurality of pulse code modulation signal paths;

a plurality of multi-path digital signal processors, each of said plurality of multi-path digital signal processors including:

a central processing unit, for performing digital signal processing;

a main bus, connected to said central processing unit, for transmitting data to and from said central processing unit;

a local area network controller, connected to said main bus and responsive to said central processing unit, for controlling communication with a local area network;

a backplane bus controller, connected to said main bus and responsive to said central processing unit, for controlling communications with said backplane bus; and a time division multiplexer, responsive to said central processing unit, for controlling and interfacing to said plurality of pulse code modulation signal paths;

a line interface, coupled to said backplane bus and to said plurality of pulse code modulation signal paths, for interfacing with a private branch exchange and for receiving at least one signal from said private branch exchange; and a digital switch, coupled to said backplane bus and to said plurality of pulse code modulation signal paths, for routing said at least one signal to one of said plurality of multi-path digital signal processors over one of said plurality of pulse code modulation signal paths.

* * * * *